US008014511B2

(12) United States Patent
Kaal et al.

(10) Patent No.: US 8,014,511 B2
(45) Date of Patent: Sep. 6, 2011

(54) COMMUNICATION SYSTEM (75) Inventors: Madis Kaal, Dublin (IE); Andres Kütt, Dublin (IE); Mart Oruaas, Dublin (IE); Asko Seeba, Dublin (IE); Taavet Hinrikus, Dublin (IE)

(73) Assignee: Skype Limited, Dublin (IE)

( * ) Notice: Subject to any disclaimer, the term of this patent is extended or adjusted under 35 U.S.C. 154(b) by 952 days.

(21) Appl. No.: 11/986,977

(22) Filed: Nov. 27, 2007

(65) Prior Publication Data
US 2008/0137834 A1 Jun. 12, 2008

(30) Foreign Application Priority Data

Nov. 27, 2006 (GB) .................................. 0623621.0
Nov. 23, 2007 (GB) .................................. 0723120.2

(51) Int. Cl.
*H04M 3/00* (2006.01)
*H04M 5/00* (2006.01)
*H04M 3/42* (2006.01)
*H04L 12/66* (2006.01)

(52) U.S. Cl. .................... 379/245; 379/207.15; 379/246; 370/352

(58) Field of Classification Search .............. 379/245, 379/246, 207.15, 221.01, 142.01, 142.04; 370/352
See application file for complete search history.

(56) References Cited

U.S. PATENT DOCUMENTS

| 6,061,363 | A | 5/2000 | Evans et al. | |
| 6,718,028 | B2 * | 4/2004 | Culli et al. | ............... 379/221.01 |
| 6,765,921 | B1 | 7/2004 | Stacey et al. | |
| 7,298,714 | B2 | 11/2007 | Foster | |
| 7,403,517 | B2 | 7/2008 | Westman | |
| 7,454,201 | B2 | 11/2008 | Brooking et al. | |

(Continued)

FOREIGN PATENT DOCUMENTS
EP     0 695 059 A1    1/1996
(Continued)

OTHER PUBLICATIONS

Notification Concerning Transmittal of International Preliminary Report on Patentability (Chapter I of the Patent Cooperation Treaty), from International Application No. PCT/IB2007/004260, dated Jun. 3, 2009.

(Continued)

*Primary Examiner* — Thjuan K Addy
(74) *Attorney, Agent, or Firm* — Hamilton, Brook, Smith & Reynolds, P.C.

(57) ABSTRACT

A method of transmitting a communication event from a calling entity to a called entity located in a communication system comprising a first network and a second network, said method comprising determining a first identity associated with the calling entity and a first and second identity associated with the called entity, wherein the first identities are recognizable in the first network and the second identity is recognizable in the second network; associating at a first node located in the second network the first identities with the second identity; establishing a connection between the calling entity and a second node; wherein the connection with second node is established using the first identity associated with the called entity; querying the first node with the first identity associated with the called entity and the first identity associated with the calling entity to determine the second identity associated with the called entity; and transmitting the communication event to the called entity using the second identity associated with the called entity.

25 Claims, 5 Drawing Sheets

U.S. PATENT DOCUMENTS

| | | |
|---|---|---|
| 7,565,436 B2 | 7/2009 | Rabie et al. |
| 7,675,881 B2 | 3/2010 | Verma et al. |
| 7,735,126 B2 | 6/2010 | Zhang et al. |
| 7,756,548 B2 | 7/2010 | Laroia et al. |
| 2002/0032631 A1 | 3/2002 | Rose |
| 2002/0071424 A1 | 6/2002 | Chiu et al. |
| 2002/0103998 A1 | 8/2002 | DeBruine |
| 2002/0116464 A1 | 8/2002 | Mak |
| 2002/0137500 A1 | 9/2002 | Brooking et al. |
| 2002/0143855 A1 | 10/2002 | Traversat et al. |
| 2003/0002485 A1 | 1/2003 | Emerson |
| 2003/0105812 A1 | 6/2003 | Flowers et al. |
| 2003/0112823 A1 | 6/2003 | Collins et al. |
| 2003/0130008 A1 | 7/2003 | Rajaniemi et al. |
| 2003/0224781 A1 | 12/2003 | Milford et al. |
| 2005/0005030 A1 | 1/2005 | Asai |
| 2005/0141509 A1 | 6/2005 | Rabie et al. |
| 2005/0144327 A1 | 6/2005 | Rabie et al. |
| 2005/0176410 A1 | 8/2005 | Brooking et al. |
| 2005/0286519 A1 | 12/2005 | Ravikumar et al. |
| 2006/0229101 A1 | 10/2006 | LaBauve et al. |
| 2006/0258289 A1 | 11/2006 | Dua |
| 2007/0066273 A1 | 3/2007 | Laroia et al. |
| 2007/0238472 A1 | 10/2007 | Wanless |
| 2008/0137829 A1 | 6/2008 | Kaal et al. |
| 2008/0137834 A1 | 6/2008 | Kaal et al. |
| 2008/0139208 A1 | 6/2008 | Kaal |
| 2008/0144578 A1 | 6/2008 | Kaal |
| 2008/0152108 A1 | 6/2008 | Kaal et al. |
| 2008/0165790 A1 | 7/2008 | Kaal |
| 2008/0192734 A1 | 8/2008 | Oruaas et al. |
| 2008/0205308 A1 | 8/2008 | Prehofer et al. |

FOREIGN PATENT DOCUMENTS

| | | |
|---|---|---|
| EP | 1 515 506 A1 | 3/2005 |
| EP | 1 643 740 | 4/2006 |
| EP | 1690165 | 8/2006 |
| GB | 2 398 458 A | 8/2004 |
| GB | 2 405 285 A | 2/2005 |
| WO | WO 99/67922 | 12/1999 |
| WO | WO 00/51331 A1 | 8/2000 |
| WO | WO 01/24478 A2 | 4/2001 |
| WO | WO 01/39469 | 5/2001 |
| WO | WO 01/63861 | 8/2001 |
| WO | WO 02/076049 | 9/2002 |
| WO | WO 02/078268 A1 | 10/2002 |
| WO | WO 03/003678 A1 | 1/2003 |
| WO | WO 2005/009019 A2 | 1/2005 |
| WO | WO 2005/084128 A2 | 9/2005 |
| WO | WO 2006/095787 A1 | 9/2006 |
| WO | WO 2007/044049 A2 | 4/2007 |
| WO | WO 2007/077550 A1 | 7/2007 |

OTHER PUBLICATIONS

Notification Concerning Transmittal of International Preliminary Report on Patentability (Chapter I of the Patent Cooperation Treaty), from International Application No. PCT/IB2007/004279, dated Jun. 3, 2009.

Notification Concerning Transmittal of International Preliminary Report on Patentability (Chapter for the Patent Cooperation Treaty), from International Application No. PCT/IB2007/004259, dated Jun. 11, 2009.

Search Report Under Section 17 for GB 0723123.6, Date of Search: Apr. 18, 2008.

* cited by examiner

COMMUNICATION SYSTEM

RELATED APPLICATIONS

This application claims priority under 35 U.S.C. §119 or 365 to Great Britain Application No. 0623621.0, filed Nov. 27, 2006 and Great Britain Application No. 0723120.2 filed Nov. 23, 2007. The entire teachings of the above applications are incorporated herein by reference.

TECHNICAL FIELD

The present invention relates to a method for handling communication in a communication system.

BACKGROUND

Communication systems link together two communication devices so that the devices can send information to each other in a call or other communication event. Information may include voice, text, images or video.

One such communication system is a peer to peer system, in which a plurality of end users can be connected for communication purposes via a communications structure such as the internet. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer systems and other communication systems that use the internet or any other packet switched network employ voice over IP (internet protocol) protocols (VoIP) to transmit data. These systems are commonly referred to as VoIP systems. VoIP systems are beneficial to the user as they are often of significantly lower cost than communication networks, such as fixed line or mobile networks, otherwise referred to as public switched telephone networks (PSTN). This may particularly be the case for long distance calls.

The connection of two communication devices using more than one type of communication network is becoming increasingly common. In some cases a call may be transmitted via more than one network in an attempt to reduce the cost of the call. For example a call between two devices located in a PSTN network may be transmitted via the internet. In other cases it is necessary to transmit the call via two communication networks when each device is located in a different communication network.

In order to place a call from a device located in one network, such as a PSTN network, to a device located in a different network, such as one connected to the internet, it is necessary for the user of the device connected to the internet to register for a PSTN dial in number with the network provider so that calls can be made to the internet user from devices in the PSTN network.

One disadvantage of this arrangement is that a device in the PSTN network can only place calls to devices connected to the internet if the user of the device has registered to have a PSTN number. A further disadvantage of this arrangement is that even if the internet user has registered to have a PSTN number, the user in the PSTN network may only call the user connected to the internet if he is aware of the PSTN number registered to the internet user.

SUMMARY

It is therefore an aim of embodiments of the invention to address at least one of the above identified problems.

According to a first aspect of the present invention there is provided a method of transmitting a communication event from a calling entity to a called entity located in a communication system comprising a first network and a second network, said method comprising the steps of: determining a first identity associated with the calling entity and a first and second identity associated with the called entity, wherein the first identities are recognizable in the first network and the second identity is recognizable in the second network; associating at a first node located in the second network the first identities with the second identity; establishing a connection between the calling entity and a second node; wherein the connection with second node is established using the first identity associated with the called entity; querying the first node with the first identity associated with the called entity and the first identity associated with the calling entity to determine the second identity associated with the called entity; and transmitting the communication event to the called entity using the second identity associated with the called entity.

According to a second aspect of the present invention there is provided a communication system comprising a first network and a second network, wherein the communication system is arranged to transmit a communication event from a calling entity to a called entity located in the communication system, said communication system comprising: a first network node located in the second network arranged to determine a first identity associated with the calling entity and a first and second identity associated with the called entity, wherein the first identities are recognizable in the first network and the second identity is recognizable in the second network; and to associate the first identities with the second identity; and a gateway node arranged to receive a connection established by the calling entity wherein the connection is established using the first identity associated with the called entity; wherein the first node is further arranged to provide the second identity associated with the called entity in response to receiving the first identity associated with the called entity and the first identity associated with the calling entity from the gateway node, such that the gateway node may transmit the communication event to the called entity using the second identity associated with the called entity.

Since the caller is allocated a PSTN number to establish a call to another party, there is no need for the caller to have prior knowledge of a fixed PSTN number that is used by the other party to receive calls.

A further advantage of embodiments of the present invention is that since both the caller identity and the allocated PSTN number are used to identify the called party, the same PSTN number may be allocated for use by more than one caller.

As the PSTN number is allocated to a caller for the duration of a session, the caller may make more than one call the same party during a session without requiring a new number each time the call is established.

A further advantage of embodiments of the present invention is that no information is required to be transmitted from the calling device in order to establish a call after a connection has been established with the PSTN network.

BRIEF DESCRIPTION OF THE DRAWINGS

For a better understanding of the present invention and as to how the same may be carried into effect, embodiments of the present invention will now be described by way of example only with reference to the following drawings.

DETAILED DESCRIPTION

Figure 1:
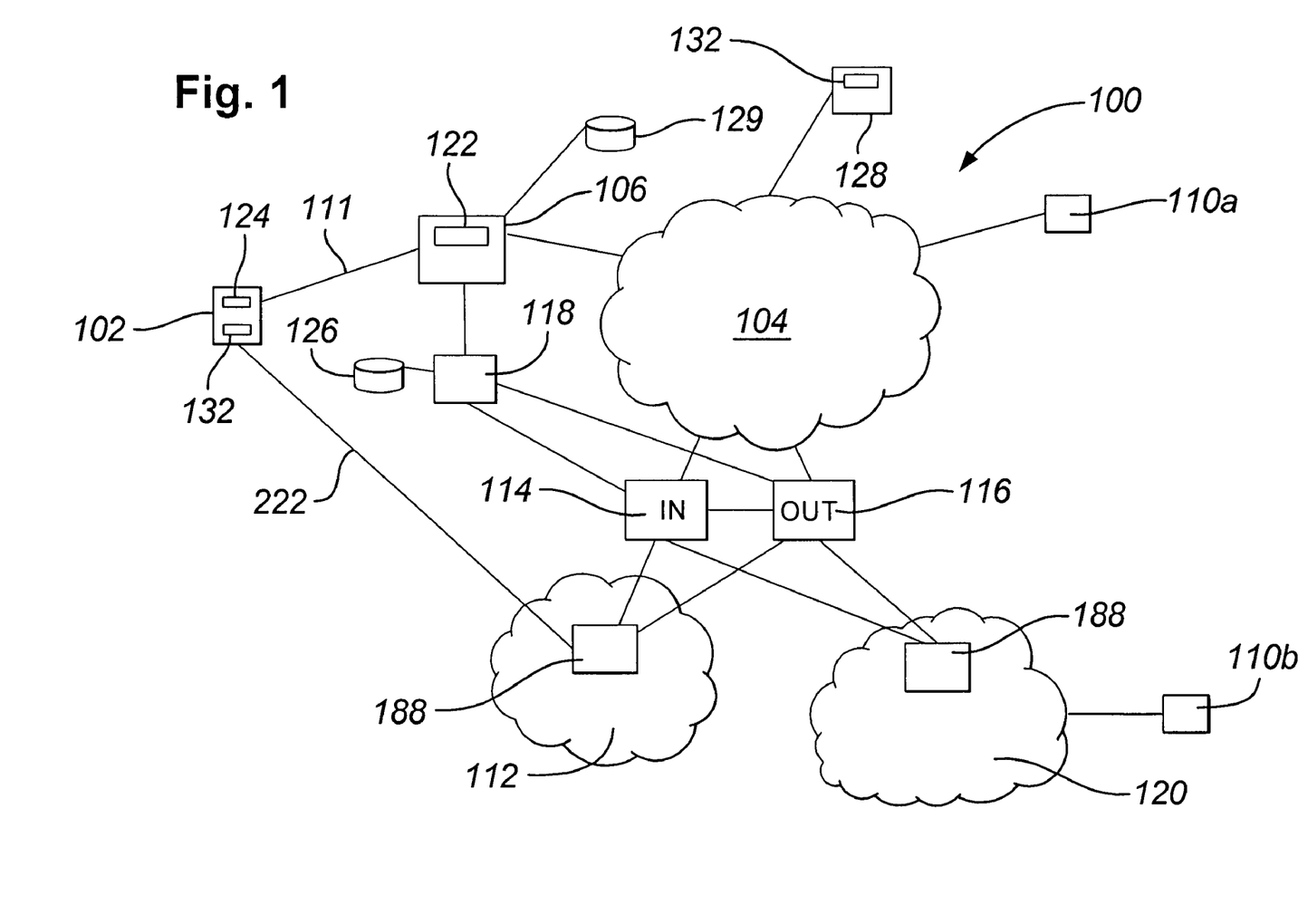
FIG. 1 is a schematic representation of a communication network in accordance with an embodiment of the invention.

Reference will first be made to FIG. 1, in which is shown a communication network 100, including a packet switched network 104 and circuit switched networks 112 and 120. In one embodiment the packet switched network 104 may be the internet. Data may be transmitted via the internet 104 via a peer to peer system. The circuit switched networks 112, 120 may be PSTN (Public Switched Telephone Network) networks.

A user device 102 is shown to be connected to the internet 104 via a session node 106. The user device 102 is also connected to the PSTN network 120. In one embodiment of the invention the user device is connected to the PSTN network 112 via a circuit switched connection 222 and to the session node 106 via a packet switched connection 111. The circuit switched connection 222 and the packet switched connection 111 may be provided by a GSM (Global System for Mobile Communications) network (not shown). For example the packet switched connection may be provided by a GPRS (General Packet Radio Service) connection of the GSM network whilst the circuit switched connection may be provided by a GSM audio connection of the GSM network. In a preferred embodiment of the invention the packet switched connection 111 is used to transmit packet data according to an internet protocol such as Transmission Control Protocol (TCP).

The user device 102 may be, for example, a personal computer, a gaming device, a personal digital assistant, a suitably enabled mobile phone, or other device able to connect to the network 104.

In accordance with an embodiment of the invention the session node 106 runs a communication instance 122 defining a session dedicated to a user of the user device 102. The communication instance 122 enables the user of the user device 102 to communicate across the communication network 100. The session node 106 is able to concurrently run a plurality of communication instances for a number of other users operating other user devices (not shown).

The user device 102 runs a client software program 124 that provides a client interface on the user device and allows the user of the user device 102 to communicate with the communication instance 122 running on the session node 106.

The client program 124 running on the user device has a number of different components or layers for implementing various functions, including a protocol layer 402 (FIG. 2a) for managing the interface with the GSM network. The interface with the GSM network will be described hereinafter with reference to FIG. 2b.

Figure 2A:
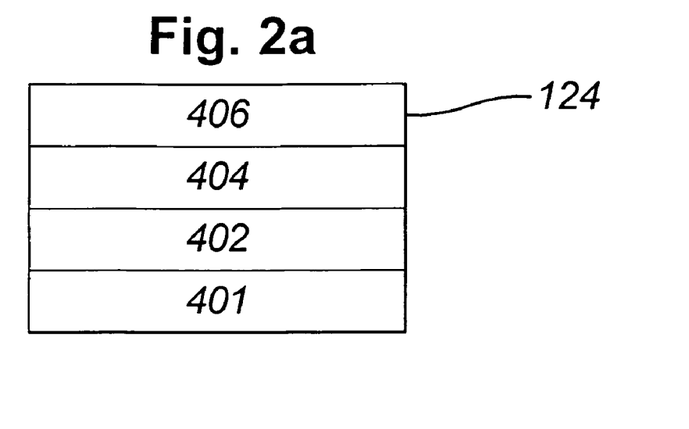
FIG. 2a is a diagram showing the protocol stack of a client program in accordance with an embodiment of the present invention.

FIG. 2a shows a protocol stack for the client program 124 according to an embodiment of the present invention. The protocol stack shows an operating system layer 401, a protocol layer 402, a client engine layer 404 and a client user interface layer 406. Each layer is responsible for specific functions. Because each layer usually communicates with two other layers, they are regarded as being arranged in a stack as shown in FIG. 2a. The operating system layer 401 manages the hardware resources of the user device 102 and handles data being transmitted to and from the session node 106. The operating system layer also handles the data being transmitted to and from the network 112. The client protocol layer 402 of the client software communicates with the operating system 401. Processes requiring higher level processing are passed to the client engine layer 404. The client engine 404 also communicates with the user client user interface layer 406. The client engine may be arranged to control the client user interface layer 406 to present information to the user via user interface means of the user device and to receive information from the user via the user interface means of the user device. The user interface means may comprise a speaker, a microphone, a display screen and a keyboard. This list is not exhaustive.

Figure 2B:
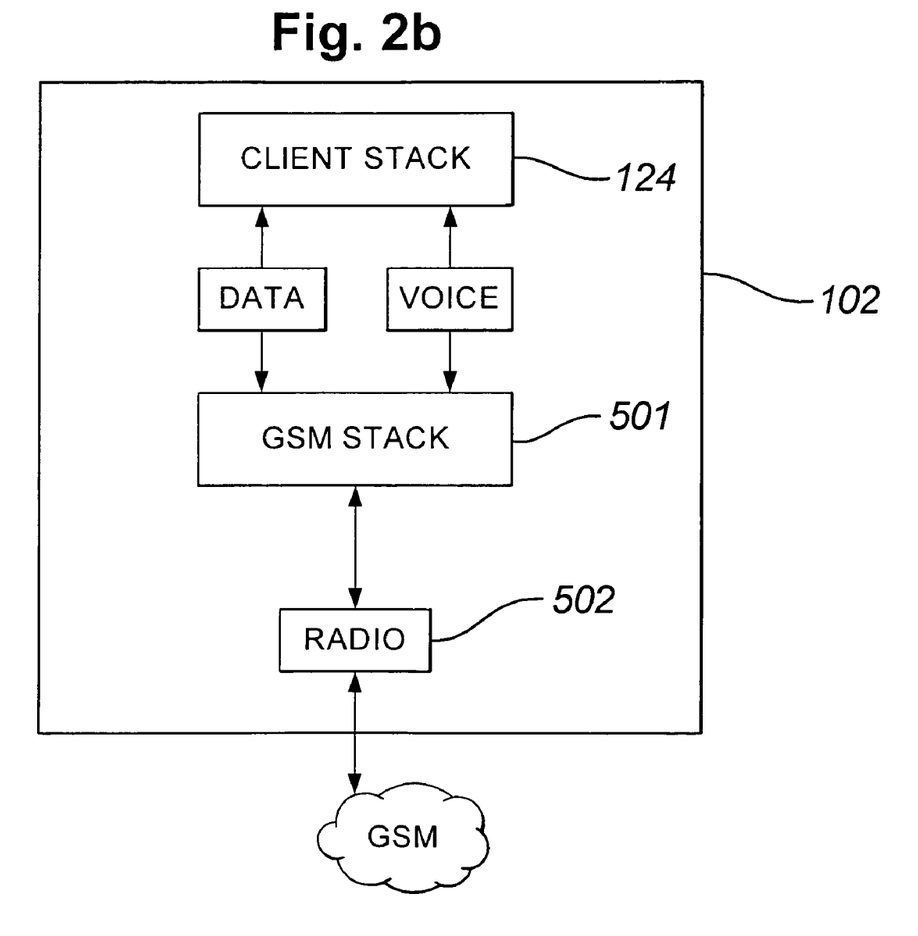
FIG. 2b is a schematic diagram showing the transmission of data between the client protocol stack and the GSM protocol stack in a user device in accordance with an embodiment of the present invention.

FIG. 2b is a schematic diagram showing the transmission of data between the client protocol stack and the GSM protocol stack in the user device 102. As shown in FIG. 2b the user device 102 further comprises a GSM protocol stack 501 and a radio transceiver 502. Information transmitted from the GSM network to the user device is received by the transceiver 502. The data received from the GSM network is processed by GSM protocol stack 501 before it is transmitted to the client program 124. Similarly, information to be transmitted to the GSM network from the client program 124 is processed by the GSM protocol stack 501 before it is transmitted to the GSM network via the transceiver 502. The operation of the GSM protocol stack 501 is known in the art and will not be described in detail herein.

Reference is again made to FIG. 1. As shown in FIG. 1 the peer to peer system on the internet 104 comprises an inbound gateway 114 and an outbound gateway 116. The inbound gateway 114 and the outbound gateway 116 are connected to PSTN gateways 188 located in the PSTN networks. The inbound gateway 114 is arranged to receive data for the peer to peer system on the internet 104 from the PSTN gateways 188. The outbound gateway 116 is arranged to transmit data from the peer to peer system on the internet 104 to the to the PSTN gateways 188.

Also shown in FIG. 1 is a profile node 128. The profile node 128 is responsible for storing user profile information for users of the peer to peer system. The user profile information includes login information for logging into the peer to peer system and a contact list 132 associated with each user of the peer to peer system. The contact list 132 comprises the addresses of, for example, other users of the communication system stored as contacts by a user.

Figure 3:
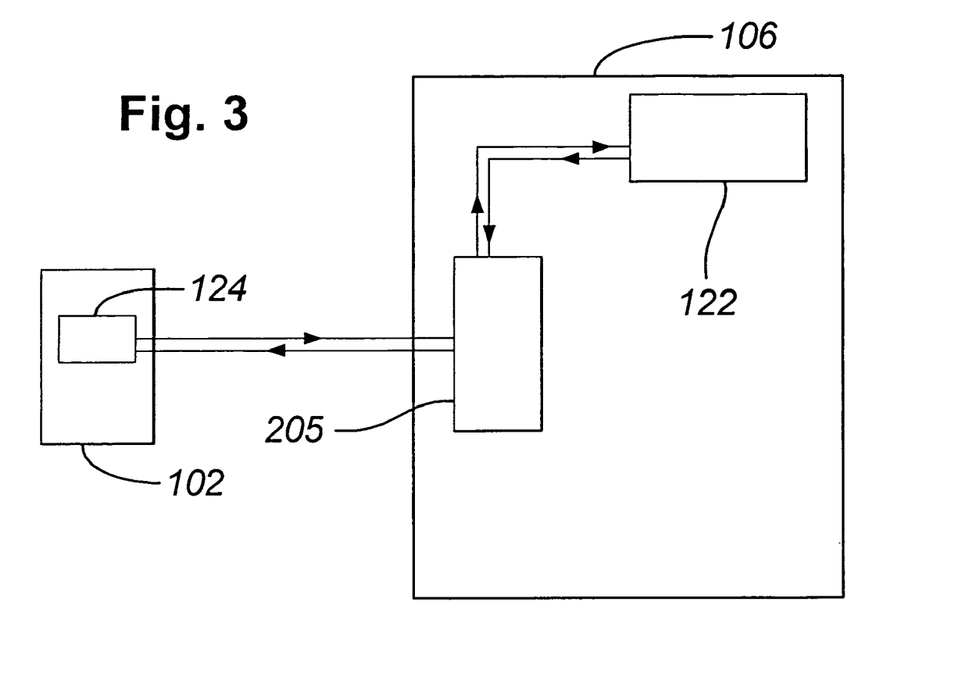
FIG. 3 is a schematic representation of part of the communication network shown in FIG. 1.

The communication instance 122 running on the session node 106 manages the communication between the client program 124 running on the device 102 and the peer to peer system on the internet 104. The communication instance may include a protocol adapter for handling communications using different protocols. FIG. 3 shows the connection path between the communication instance 122 on the session node 106 and the client program 124 running on the user device 102. As shown in FIG. 3, the session node 106 further comprises a core module 205 for allocating a communication instance 122 to a client program 124.

In accordance with an embodiment of the invention the client program 124 running on the user device 102 is arranged to set up a connection with the session node 106. The client program 124 sends the session node 106 data relating to the user device 102 via the packet switched connection 111 in a data packet. The data packet may include the attributes listed in table 1:

TABLE 1

| KEY | TYPE | ATTRIBUTE |
|---|---|---|
| CHUNKTYPE | integer | CLIENTDATA |
| DEVICE_PSTNNUMBER | string | device PSTN number in international notation. |

As shown in table 1, the data packet includes an attribute defining an IP address of the user device and an attribute defining a PSTN number of the device. The PSTN address identifies the user device 102 in the PSTN network 112.

After a connection between the client program 124 and the session node 106 has been established the user of the user device may then provide login information to the session node 106 in order to log into the peer to peer system on the internet 104.

The session node may verify the login information provided from the user device against the profile information for the user of the user device 102 stored on the profile node 128. On verification of the login information provided from the user device 102 the core module 205 will assign a dedicated communication instance 122 to the client program 124.

The communication instance 122 associates the identity of the user of the user device, as defined by at least part of the login details of the user, with the identity of the device. In one embodiment of the invention the communication instance may store the identity of the user together with the identity of the user device in a data store 129 associated with the communication instance 122.

According to an embodiment of the invention it is possible for the user of the user device to log into the peer to peer system using more than one user device. According to this embodiment of the invention the communication instance will associate the identity of each device with the identity of the user.

Once the session node 106 has assigned a communication instance 122 to the user device 102 the communication instance 122 will provide the client program 124 with data to enable to the client program to establish a communication event with an entity in the communication network 100.

The entity may be any node in the communication system 100 that is capable of receiving information from the user device 102. For example the entity may be another user device or a node in the communication system 100. The entity may correspond to voice mail records, or other data records associated with the user of the user device. Additionally an entity may be a node arranged to carry out control commands in the network.

An entity is located by an address in the network in which it resides. The address of an entity that resides in the internet 104 may be for example an IP address, a URI (Uniform Resource Indicator), a username, or a VoIP device. The address of an entity that resides in the PSTN network may be a PSTN number associated with the entity.

In one embodiment of the invention the entity may relate to more than one end point in the communication network 100. For example the entity may be a user that is logged into the peer to peer system of the internet using two or more user devices. In this case an entity will have more than one associated addresses.

In accordance with an embodiment of the invention the user device 102 may establish a communication event with an entity via more than one network of the communication system. For example the user device 102 may establish a call using the PSTN network 112 to an entity located in the internet 104.

In order to establish a communication event with an entity over more than one network it is necessary to identify the entity in each network.

In accordance with an embodiment of the invention the communication instance 122 is arranged to allocate an identity to an entity that may be transmitted and interpreted by both the PSTN network and the peer to peer system on the internet. In this case the identity of the entity may be resolved to the address of the entity by a node located in the internet 104. In a preferred embodiment of the invention the allocated identity is a PSTN number.

For example, if the entity is located in the internet, the public IP address of the entity in the internet will not be recognized by the PSTN network. According to an embodiment of the invention the communication instance 122 is arranged to allocate a PSTN number to the entity that may be used to establish a call to the via the PSTN network. The allocated PSTN number may then be resolved to the IP address of the entity at a location in the internet.

As shown in FIG. 1 a call manager 118 is connected to the session node 106, the inbound gateway 114 and the outbound gateway 116. The call manager has access to a data store 126. In FIG. 1 the data store 126 is shown as being associated with the call manager 118.

Figure 6:
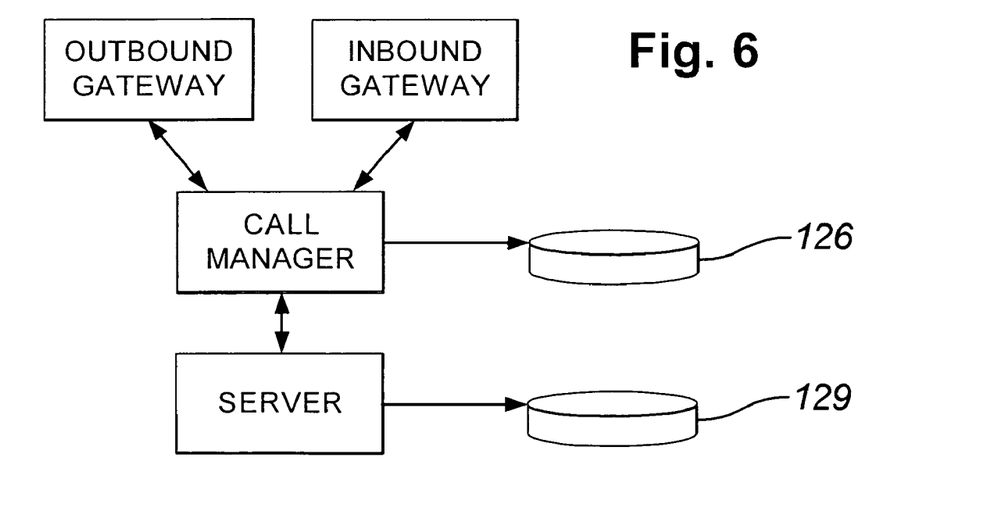
FIG. 6 shows the logical connections between a call manager, a session node, an inbound gateway and an outbound gateway according to an embodiment of the present invention.

In the embodiment shown in FIG. 1 the call manager 118 is shown as being located separately from the session node 106 and the gateways 114 and 116. In alternative embodiments the call manager 118 may however form part of either the session node 106 or of one of the gateways 114 or 116. The logical connections between the call manager, the session node, the inbound gateway and the outbound gateway are shown in FIG. 6.

The call manager 118 is arranged to provide the communication instance 122 with a PSTN number to be allocated to an entity in response to a request from the communication instance. The communication instance is arranged to allocate the PSTN number to the entity and to provide the address of the entity to the call manager. The call manager is then arranged to store the allocated PSTN number in the data store 126 together with the address of the entity.

In a preferred embodiment of the invention the address of an entity may be determined by the communication instance from the contact list 132 provided from the profile node 128. This embodiment of the invention will be described with reference to FIG. 4.

Figure 4:
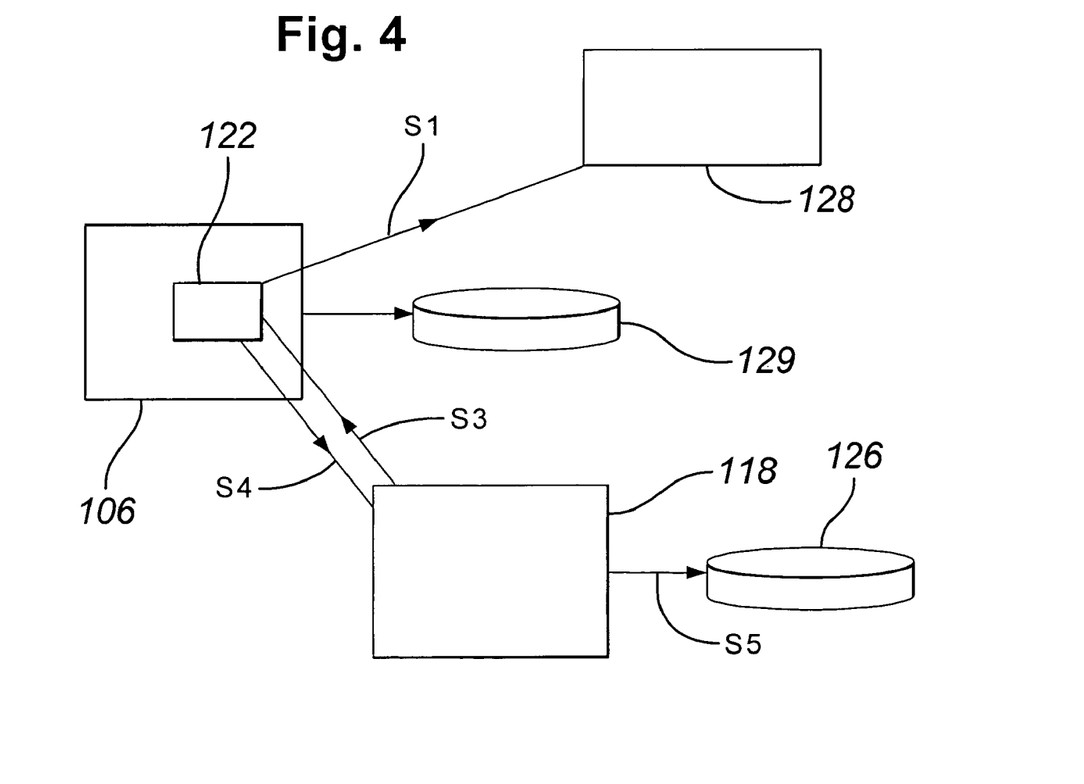
FIG. 4 is a schematic representation of part of the communication system shown in FIG. 1 according to an embodiment of the present invention.

FIG. 4 is a diagram showing the steps for allocating a PSTN number to an entity in accordance with a preferred embodiment of the invention.

In step S1 the communication instance 122 is arranged to retrieve the addresses of the entities of that are listed as contacts in the contact list 132 associated with the user of the user device 102. The addresses of the entities are retrieved from the profile node 128.

In step S2 the communication instance stores the address of each entity in the data store 129. In a preferred embodiment of the invention the entire contact list 132 is stored in the data store 129.

In step S3 the communication instance 122 is then arranged to retrieve a PSTN number for each entity listed in the contact list from the call manager.

In step S4 the communication instance 122 is arranged to allocate each PSTN number to each entity listed in the contact list and to report the address of each entity to the call manager, together with an indication of which PSTN number has been allocated to which entity.

In step S5 the call manager 118 is arranged to store in the data store 126 the address of each entity listed in the contact list in association with the allocated PSTN number.

In a preferred embodiment of the invention the call manager 118 is arranged to additionally store in the data store 126 the PSTN number of the user device 102 in association with the PSTN number allocated to the entity. The PSTN number of the device may be reported to the call manager in either step S3 or step S4 by the communication instance. In this embodiment of the invention the address of the entity may be resolved using the PSTN number allocated to the entity and the PSTN number of the device. In this case one PSTN number may be allocated for use by more than one user having a communication instance running on the session node 106.

The allocated PSTN numbers may be stored in association with the address of each entity and the PSTN number of the user device 102 for the duration of the session between the client program 124 running on the device 102 and the session node 106. A session is started when the session node 106 assigns a dedicated communication instance 122 to the client program 124. A session may be closed when the client program 124 transmits a logout request to the session node, or when a session is timed out.

The contact list 132 together with the PSTN numbers allocated to each entity in the contact list are transmitted from the communication instance to the client program 124. The contact list 132 and the allocated PSTN numbers may then be stored in a data store accessible to the client program 124, located in the user device 102.

In a preferred embodiment of the invention the allocated PSTN numbers and the contact list 132 are transmitted to the client program 124 in data packets via the data connection 111. The allocated PSTN numbers may be provided in a separate data packet from the contact list 132.

At least part of the PSTN numbers may be provided to the client program in a 'call set up' data packet comprising the attributes listed in table 2:

TABLE 2

| KEY | TYPE | ATTRIBUTE |
| --- | --- | --- |
| CHUNKTYPE | integer | CALLSETUP |
| CALLMETHOD | integer | a numeric value identifying calling method to use |

TABLE 2-continued

| KEY | TYPE | ATTRIBUTE |
| --- | --- | --- |
| DIALIN_NUMBER_PREFIX | string | first number in dial-in number range, for example "+3725521000" |
| DIALIN_NUMBER_RANGE_SIZE | integer | # of numbers in dial-in block, for example 1000 |
| VOICEMAIL_NUMBER_PREFIX | string | dial-in number range for listening voicemails |
| VOICEMAIL_NUMBER_RANGE_SIZE | integer | # of numbers in voicemail number block |

In one embodiment of the invention each PSTN number for calling an entity may be listed separately in the data packet. However in a preferred embodiment, each PSTN number may be determined by the client program 124 from a first number corresponding to a 'DIAL IN NUMBER PREFIX' and a second number corresponding to an index number identifying the contact in the contact list (see table 3). The index number will fall within the number range, referred to as the 'DIAL IN NUMBER RANGE' as shown in table 2.

The index number for each contact is transmitted in the contact list from the communication instance 122 to the client program 124.

Table 3 shows the attributes of the data packet containing the contact list 132. Each entity in the contact list is given an index value starting from 1. The attribute container containing the contact list may further include the contacts username, or URI for contacting the contact using the peer to peer system, and the name of the contact.

TABLE 3

| KEY | TYPE | ATTRIBUTE |
| --- | --- | --- |
| CHUNKTYPE | integer | ENTITY |
| ENTITYINDEX | integer | entity index value, starting from 1 |
| USERNAME | string | entity username |
| FULLNAME | string | |
| PSTNNUMBER | string | |

The client program 124 may determine the PSTN number for each entity in the contact list by arithmetically adding the first number to the index for the entity. For example if the first number is defined as:
+3725521020
and the index for an entity is:
33
the PSTN number for the entity will be:
+3725521053

Alternatively the client program may determine the PSTN number by appending the index to the first number. For example, if the first number is:
+37255210
and the index corresponding to an entity is:
33
the PSTN number for the entity will be:
+3725521033

In one embodiment of the invention the call method attribute referred to in table 2 may indicate how the PSTN number should be determined from the information provided in the data packet. For example, the call method may specify whether the PSTN number should be determined by arithmetically adding the member of the number range to the first number, or by appending the member of the number range to the first number, or whether the entire PSTN number is listed in the data packet.

Accordingly, the PSTN number allocated to an entity may be determined at the client program 124, the communication instance 122 and the call manager 118.

In accordance with an embodiment of the invention the user device 102 may establish a call to an entity located in the communication network 100 via the PSTN network using the PSTN number allocated to the entity. The user device 102 may also receive calls from an entity located in the communication network via the PSTN network.

Figure 5:
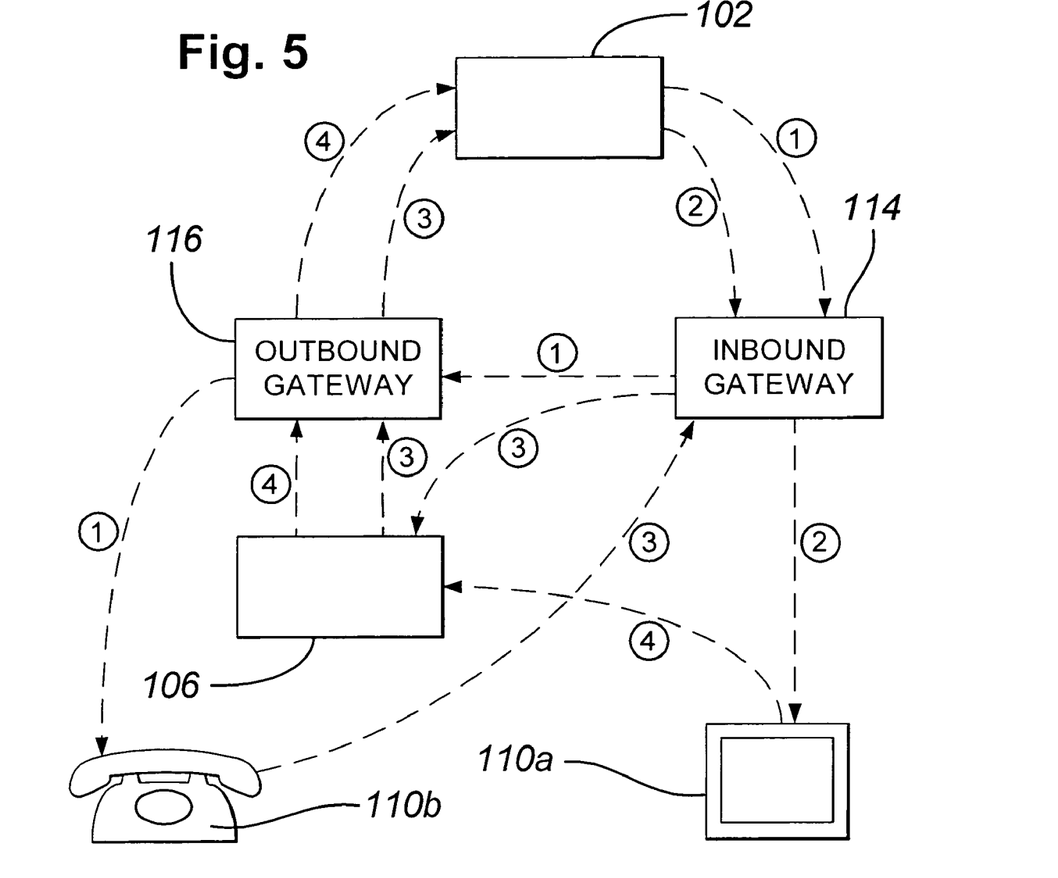
FIG. 5 shows the call connections made when placing calls between a user device and entities located in the communication system according to an embodiment of the present invention.

FIG. 5 shows the call connections made when placing calls between the user device 102 and entities located in the communication network. More specifically FIG. 5 shows the following call connections:

(1) an outbound call from the user device 102 to an entity 110*b* located in the PSTN network;

(2) an outbound call from the user device 102 to an entity 110*a* located in the internet 104;

(3) an inbound call to the user device 102 from an entity 110*b* located in the PSTN network; and (4) an inbound call to the user device 102 from an entity 110*a* located in the PSTN network.

As shown in FIG. 5, outbound calls made from the user device 102 to an entity are routed to the inbound gateway 114. The inbound gateway is then able to determine the address of the entity by querying the data store 126 via the logical connections illustrated in FIG. 6. The method of calling an entity from the user device 102 will now be describe in detail in relation to FIG. 7.

Figure 7:
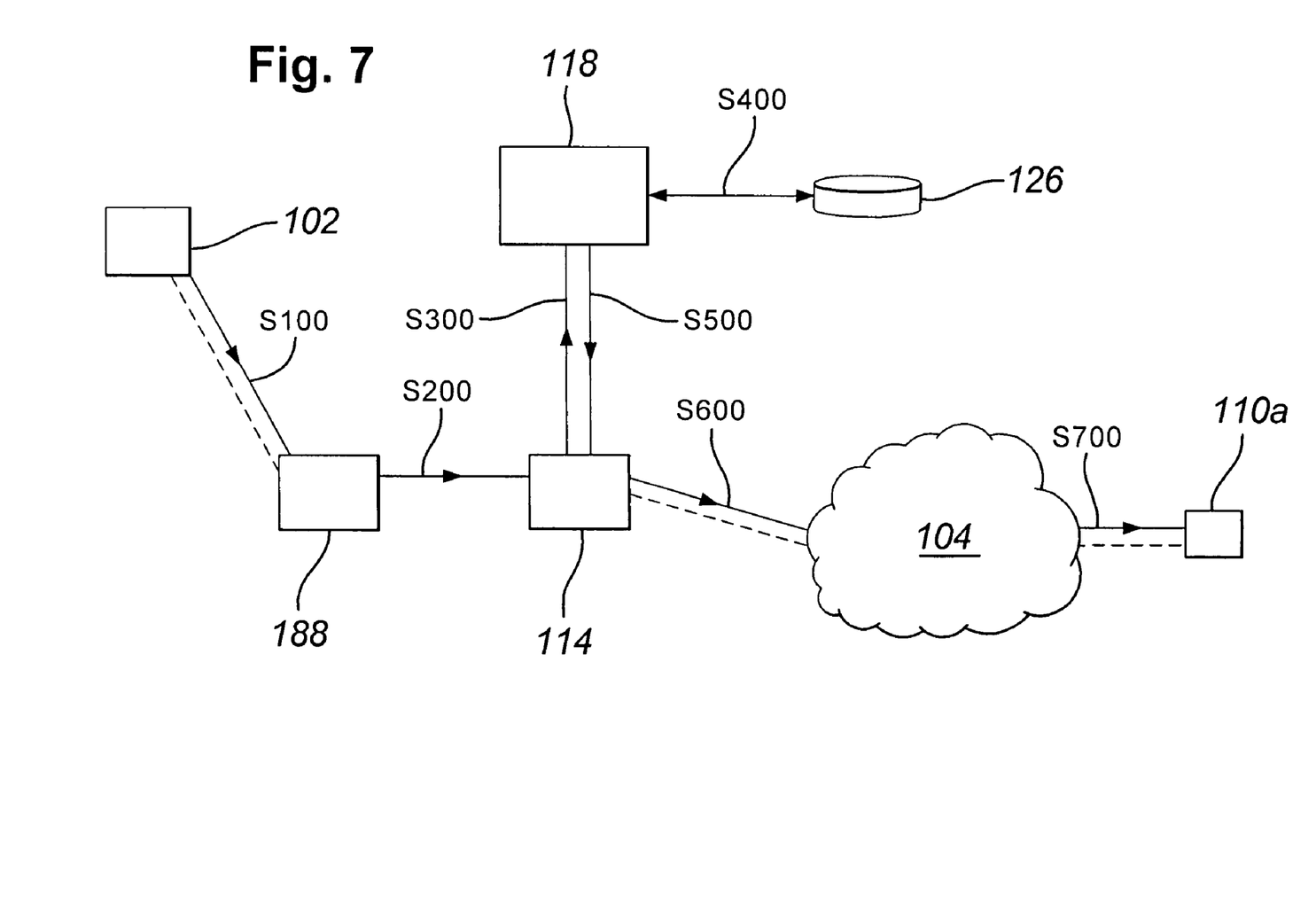
FIG. 7 is a diagram showing the initiation of a call in accordance with an embodiment of the present invention.

A call comprises both a media data connection and a control data for handling the call set up. In FIG. 7 the control data connection for transmitting control data and the media data connection for transmitting the media data are shown separately. The control data connection is shown as a solid line and the call connection is shown as a broken line.

In step S100 the user of the user device 102 initiates a call to an entity listed in the contact list 132. The contact list 132 may be displayed by the user interface layer of the client program 124 as selectable links on a display of the user device 102. The user may initiate a call to the entity by selecting a link for that entity. When the user initiates the call the client program 124 is arranged to dial the PSTN number allocated to that entity. The call placed by the client program 124 will therefore include control data that defines the allocated PSTN number. The control data will also include the PSTN number of the user device 102. The dialed PSTN number allocated to entity is used to establish a media data connection and control data connection with the PSTN gateway 188 via the GSM audio connection 222.

In step 200 the media data connection is held at the PSTN gateway 188. The PSTN gateway 188 is arranged to transmit the control data to the inbound gateway located in the internet 104. The PSTN gateway 188 is arranged to transmit control data comprising recognised PSTN numbers to the inbound gateway 114. The PSTN gateway may recognise numbers that have been provided for use by the call manager 118 by the operator of the PSTN network.

In step S300 the inbound gateway 114 transmits the control data comprising the allocated PSTN number of the called entity and the PSTN number of the user device to the call manager 118. The media data connection is held at the PSTN gateway 188 until the allocated PSTN number of the called entity is resolved to the address of the entity.

At step S400 the call manager 118 uses the PSTN number of the device 102 to search the data store 126 for the contact list 132 associated with the user of the device 102. The PSTN allocated to the entity is then used to locate the address of the entity as defined in the contact list 132. In one embodiment of the invention the call manager may also retrieve the username of the user associated with the user of the user device 102.

In step S500 the address of the entity is transmitted to the inbound gateway 114. The call manager 118 may also transmit the username of the user of the user device 102 to the inbound gateway 114.

In step S600 the inbound gateway 114 accepts the media data from the PSTN gateway and uses the address of the entity received from the call manager 118 to transmit the call via the packet switched network 104. If the address of the entity is located in the PSTN network the inbound gateway will transmit the call to the PSTN network via the outbound gateway 116 (shown in FIG. 1).

In step S700 the call is received at the called entity, e.g. device 110*a* or 110*b*. If the called entity is located in the internet 104 the username of the user of the device 102 retrieved in step S500 may be displayed on the device 110*a* to indicate the origin of the call.

In an alternative embodiment of the present invention the entity that the user of the user device 102 places a call to is not listed as a contact in the contact list 132. In this embodiment of the invention the user device 102 is arranged to provide the communication instance 122 with the address of the entity via the data connection 111 before initiating a call with the entity. In this embodiment of the invention a PSTN number defined in the 'call set up' message described in relation to table 2 is reserved for an entity that is not listed in the contact list. When the communication instance receives the address of the entity from the user device, the address of the entity is stored in the data store 126 in association with the reserved PSTN number. A call may then be placed to the entity via the PSTN network in accordance with the method steps described in relation to FIG. 7.

In a further alternative embodiment of the invention, for predefined addresses stored in the data store 126 the call manager is arranged to instruct the inbound gateway to not accept the call and instead to provide the PSTN gateway 188 with the address to route the call via the PSTN network. In a preferred embodiment these addresses may relate to emergency numbers e.g. '999'.

In one embodiment of the invention the address of an entity may specify the location of a voicemail record associated with the user. The address of a voicemail record may be determined using the username of the user and the address of a voicemail node. The address of the voicemail node may be prestored in the data store 126. Alternatively the address of the voicemail record may be provided in the contact list associated with the user.

In an further embodiment of the invention the address of an entity may specify a control command that may be implemented by a node. For example the address of the entity may define a specific action to be implemented for the user's voicemail record by the voicemail node. For example the control command may cause the voicemail node to delete all messages stored in the user's voicemail record.

In one embodiment of the invention the communication instance is arranged to provide information relating to the geographical location of the user device 102 to the call manager 118 when requesting a PSTN number. In this embodiment of the invention the call manager is arranged to provide the communication instance 122 with PSTN numbers that relate to PSTN gateways that are local to the user device, otherwise referred to as a local number.

In an alternative embodiment of the addresses of the entities having an allocated PSTN number may be stored at a data store associated with the inbound gateway. In this embodiment of the invention the address may be resolved at the inbound gateway.

In an alternative embodiment of the addresses of the entities having an allocated PSTN number may be stored at a data store associated with the PSTN gateway In this embodiment of the invention the address may be resolved at the PSTN gateway.

In an alternative embodiment of the invention the call data may be held at the PSTN gateway until the address of the entity is resolved. In this case the inbound gateway 114 instructs the PSTN gateway to forward the call data after the address of the entity is resolved.

While this invention has been particularly shown and described with reference to preferred embodiments, it will be understood to those skilled in the art that various changes in form and detail may be made without departing from the scope of the invention as defined by the claims.

What is claimed is:

1. A method of transmitting a communication event from a calling entity to a called entity located in a communication system comprising a first network and a second network, the method comprising:
    determining a first identity associated with the calling entity and a first and second identity associated with the called entity, wherein the first identities are recognizable in the first network and the second identity is recognizable in the second network;
    associating at a first node located in the second network the first identities with the second identity;
    establishing a connection between the calling entity and a second node; wherein the connection with second node is established using the first identity associated with the called entity;
    querying the first node with the first identity associated with the called entity and the first identity associated with the calling entity to determine the second identity associated with the called entity; and
    transmitting the communication event to the called entity using the second identity associated with the called entity.

2. A method as claimed in claim 1 further comprising:
    transmitting a request for the first identity associated with the called entity from the calling entity to the first node; and
    providing the first identity associated with the called entity from the first node to the calling entity in response to said request.

3. A method as claimed in claim 2 wherein the request for the first identity is transmitted via a connection provided by the second network.

4. A method as claimed in claim 2 wherein the first identity is provided via a connection provided by the second network.

5. A method as claimed in claim 1 wherein the calling entity is associated with a contact list accessible to said first node.

6. A method as claimed in claim 5 wherein the contact list comprises a list of second identities associated with entities that may be called by the calling entity.

7. A method as claimed in claim 5 wherein the second identity associated with the called entity is determined from the contact list associated with the calling entity.

8. A method as claimed in claim 1 wherein determining the first identity of the called entity comprises allocating the first identity to the called entity from a pool of available identities.

9. A method as claimed in claim 5 wherein determining the first identity of the called entity comprises generating the first identity from a first number and a second number, wherein the second number corresponds to a list position of the second identity associated with the called entity in the contact list.

10. A method as claimed in claim 1 wherein the second identity associated with the called entity defines a plurality of end points located in the communication system.

11. A method as claimed in claim 1 further comprising:
    determining a second identity associated with the calling entity, wherein the second identity associated with the calling entity is recognizable in the second network; and
    associating at the first node the second identity associated with the calling entity with the first identity associated with calling entity.

12. A method as claimed in claim 11 wherein querying the first node with the first identities determines the second calling identity associated with the calling entity.

13. A method as claimed in claim 12 wherein the communication event is transmitted to the called entity together with the second identity associated with the calling entity.

14. A method as claimed in claim 1 wherein the first identities associated with the called entity and the calling entity are recognizable on the second network.

15. A method as claimed in claim 1 wherein the called entity is a user of the communication system.

16. A method as claimed in claim 1 wherein the called entity is a voicemail record.

17. A method as claimed in claim 1 wherein the called entity corresponds to a control command.

18. A method as claimed in claim 1 wherein the first network is a circuit switched network.

19. A method as claimed in claim 1 wherein the second network is a packet switched network.

20. A method as claimed in claim 1 wherein the first identity associated with the called entity is a local number.

21. A method as claimed in claim 1 wherein the first identities are associated with the second identity at the first node for the duration of a communication session associated with the calling entity.

22. A communication system comprising a first network and a second network, wherein the communication system is arranged to transmit a communication event from a calling entity to a called entity located in the communication system, the communication system comprising:
    a first network node located in the second network arranged to determine a first identity associated with the calling entity and a first and second identity associated with the called entity, wherein the first identities are recognizable in the first network and the second identity is recognizable in the second network; and to associate the first identities with the second identity; and
    a gateway node arranged to receive a connection established by the calling entity wherein the connection is established using the first identity associated with the called entity;

wherein the first node is further arranged to provide the second identity associated with the called entity in response to receiving the first identity associated with the called entity and the first identity associated with the calling entity from the gateway node, such that the gateway node may transmit the communication event to the called entity using the second identity associated with the called entity.

23. A communication system as claimed in claim 22 further comprising a second network node located in the second network wherein the second network node is arranged to associate the first identity associated with the called entity to the called entity.

24. A communication system as claimed in claim 22 wherein the gateway node is a gateway of a communication system operating on the second network.

25. A communication system as claimed in claim 22 wherein the gateway node is a gateway of a communication system operating on the first network.

* * * * *